United States Patent [19]
Lawrence et al.

[11] Patent Number: 4,939,508
[45] Date of Patent: Jul. 3, 1990

[54] POINT AND SELECT DEVICE

[75] Inventors: James G. Lawrence, Buckeye; Oscar R. Diaz, Phoenix; Robert E. Erdmann, Jr., Tempe, all of Ariz.

[73] Assignee: Emtek Health Care Systems, Inc., Tempe, Ariz.

[21] Appl. No.: 264,646

[22] Filed: Oct. 31, 1988

[51] Int. Cl.⁵ ............................................. G06F 3/033
[52] U.S. Cl. ..................................... 340/710; 340/709; 74/471 XY
[58] Field of Search ................. 340/709, 710; 200/61, 200/47; 74/471 XY; D14/48

[56] References Cited

U.S. PATENT DOCUMENTS

| D. 291,318 | 8/1987 | Kim | D14/48 |
|---|---|---|---|
| 4,129,982 | 12/1978 | Cruz | 200/61.47 |
| 4,559,532 | 12/1985 | Hosogoe | 340/710 |
| 4,562,347 | 12/1985 | Hovey et al. | 340/710 |
| 4,804,949 | 2/1989 | Faulkerson | 340/710 |

Primary Examiner—Alvin Oberley
Assistant Examiner—Xigo Wu
Attorney, Agent, or Firm—Paul F. Wille

[57] ABSTRACT

A point and select device is disclosed in which a sphere protruding from one major surface of a housing can serve as either a trackball or the moving element in a mouse. Actuators on either side of the device are selected according to the use of the device. The sense of motion for up/down is reversed between the two modes of operation.

5 Claims, 2 Drawing Sheets

POINT AND SELECT DEVICE

BACKGROUND OF THE INVENTION

This invention relates to an ergonomic controller and, in particular, to a control device for conveying positional and other information from a human operator to a machine.

In the prior art, a variety of mechanisms have been proposed, or even used, to enable a human operator to convey positional or other information to a machine. In the particular case of a computer displaying information on a screen, these mechanisms have taken the form of what are popularly known as joystick, trackball, or mouse, to name a few.

The trackball and mouse have at least one advantage over other mechanisms in that the range of motion is not limited by mechanism itself; i.e. the turning of the trapped sphere in these mechanisms can continue indefinitely in any direction. Between these two mechanisms, there are advantages and disadvantages for each. In the past, one had to choose which type of mechanism to use, e.g. as the cursor control on a computer. The problem of having one or the other mechanisms, but not both, has not been lost on those in the art. U.S. Pat. No. 4,562,347 describes a device which ostensibly can function as either a trackball or a mouse. However, the device described requires a special cradle or other support to function as a trackball. Thus, the problem remains of providing an easily used device which can function as either a trackball or a mouse.

In view of the foregoing, it is therefore an object of the present invention to provide a combination mouse/trackball.

Another object of the present invention is to provide a self-contained mouse/trackball which automatically reverses the sense of motion depending upon its mode of operation.

A further object of the present invention is to provide a combination mouse/trackball having selection actuators enabled in accordance with the mode of operation.

SUMMARY OF THE INVENTION

The foregoing objects are achieved in the present invention wherein a trapped sphere protrudes through a single surface of the housing enclosing the sphere. Orientation means, within and attached to the housing, provide an electrical signal indicative of the mode of operation, mouse or trackball. Encoder means provide electrical signals indicative of motion of the sphere relative to two, orthogonal axes of rotation. Logic means combine these signals to provide an output signal. The sense of rotation about the axes is reversed between the two modes so that the sense of motion is as expected by the user regardless of mode.

BRIEF DESCRIPTION OF THE DRAWINGS

A more complete understanding of the present invention can be obtained by considering the following detailed description in conjunction with the accompanying drawings, in which.

DETAILED DESCRIPTION OF THE INVENTION

Figure 1:
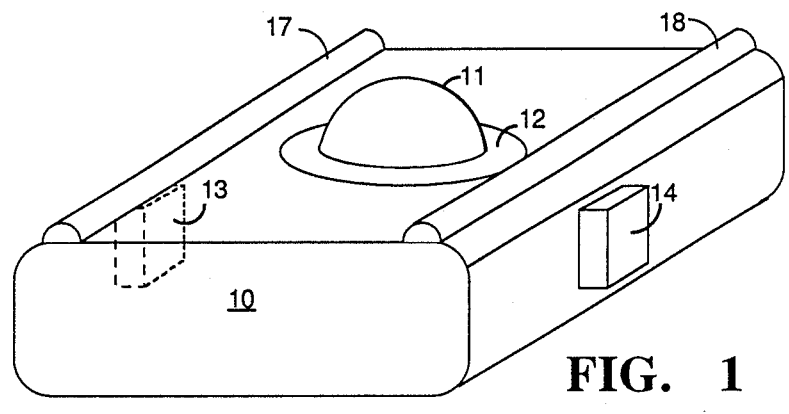
FIG. 1 illustrates the outward appearance of a device in accordance with the present invention.

FIG. 1 illustrates a preferred embodiment of the present invention wherein housing 10 enclose a substantial portion of sphere 11, which is held in place by closure ring 12. On either side of housing 10 are selection actuators 13 and 14, such as are typically used to indicate a choice or a predetermined activity for the computer.

When oriented as illustrated, housing 10 rests in a given location on a desk or other suitable support. Sphere 11 is rotated by the user to move a cursor or indicia about a screen. Either actuator 13 or 14 is depressed to indicate the selection of an item, for example. When operated a mouse, the device is inverted so that sphere 11 is in contact with a generally planar surface. Moving the device about the surface causes sphere 11 to rotate and the motion is translated into electrical signals for the computer. Since the sense of motion is reversed from the trackball mode of operation, logic means are provided for reversing the sense of motion conveyed to the user. Further, since actuators 13 and 14 are symmetrically located with respect to housing 10, the user does not have to switch hands or change the manner in which a choice is indicated to the computer.

Housing 10 can comprise any suitable material which can be molded or formed to accept the subassemblies within. One such subassembly is the captured sphere, which preferably is approximately one inch in diameter and can rotate freely within the housing. The surface of the sphere has a texture such that sufficient friction exists between the sphere and the surface or hand with which it comes in contact so that motion of the sphere is easily caused without excessive slippage. Closure ring 12 comprises a suitably low friction material such as, but not limited to, a plastic sold by General Motors Corporation under the name "Delrin." Actuators 13 and 14 may comprise any switch mechanism, e.g. resistive, capacitive, or magnetic means.

Located along two edges of housing 10 are ridges 17 and 18 which serve to support the device in the mouse mode. Instead of ridges 17 and 18, one could provide a plurality of posts or a single ridge extending all the way around the edge of the device. It is preferable however that sphere 11 not be fully enclosed by a ridge to avoid collecting spilled liquids in the vicinity of sphere 11. In addition to not completely encircling sphere 11 with a ridge, one could locate sphere 11 in a pitcher's mound formed in the surface of device 10. Closure ring 12 fits sufficiently closely to sphere 12 to prevent liquids from flowing freely to within device 10, but not so closely as to impede the rotation of sphere 11.

Figure 2:
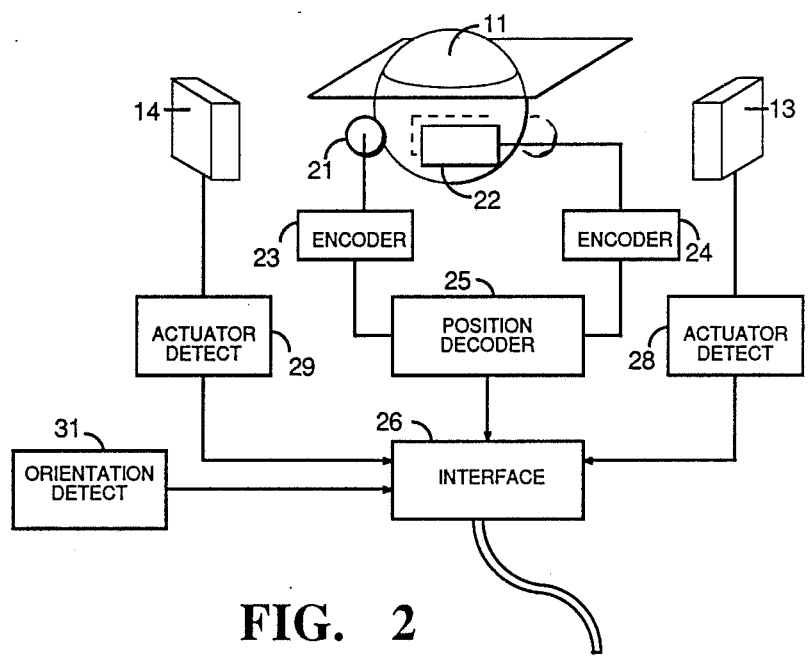
FIG. 2-4 illustrate the electronics within the device in accordance with the present invention.

The electronic subassembly within housing 10 is illustrated in FIG. 2. Specifically, sphere 10 is in contact with rollers 21 and 22, which lie in orthogonal planes. These rollers are connected to respective encoders 23 and 24. Additional rollers are provided, positioned opposite rollers 21 and 22, for supporting sphere 11. Depending on how hard sphere 11 is, these additional rollers may or may not be resiliently mounted to provide a yielding contact between sphere 11 and the surface on which it rests in the mouse mode.

Encoders 23 and 24 produce electrical signals indicative of the direction of rotation and the amount of rotation of sphere 11 along a given axis. Position decoder 25 combines this information for interface circuitry 26, which provides the electrical connection to the computer via a suitable cable. Actuators 13 and 14 are connected to respective detectors 28 and 29, which have the outputs thereof connected to interface 26. Orientation detector 31 preferably comprises a mercury switch or an optical detector for indicating the orientation of housing 10. This information is converted to an electrical signal by orientation detector 31. The signal is also coupled to interface circuit 26.

Interface 26 can comprise any suitable circuit, known per se in the art for providing data in a particular format intelligible to the computer to which the device is connected. Some formats, for example, are known as Logitek/Microsoft, "Delta Data", an "Mouse Systems". With one modification, described in connection with FIGS. 3 and 4, such standard circuitry is usable in the present invention.

Figure 3:
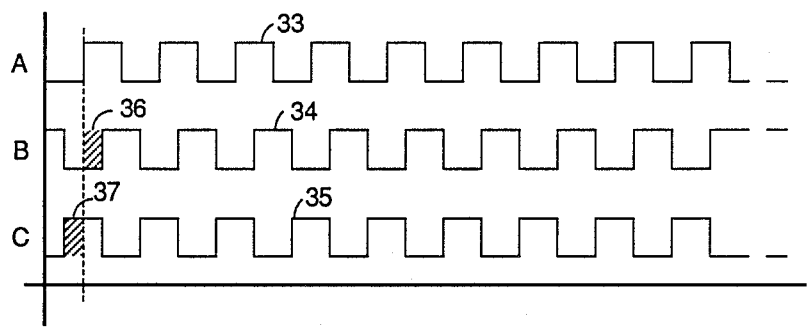

As known per se in the prior art, sphere 11 is free to rotate in any direction. The motion of sphere 11 is projected onto orthogonal axes defined by rollers 21 and 22. As sphere 11 rotates, one or the other or both of rollers 21 and 22 rotate also. The motion is converted into an electrical signal by encoders 23 and 24 respectively. Considering the output of a signal encoder, the electrical signal provided typically comprises a pulse train wherein the number of pulses per unit time is indicative of the amount of rotation along a given axis in that amount of time. Curve 33 in FIG. 3 illustrates such a pulse train. The amount of rotation, of itself, is insufficient information. One also needs to know direction. Typically this is provided by a quadrature signal, such as curve 34 in FIG. 3. Pulse train 34 has the same duty cycle and frequency of pulse 33 but is phase shifted relative to curve 33 by ninety degrees. As indicated by gap 36, the pulses in curve 34 trail the pulses in curve 33. These two waveforms provide sufficient information to encode the motion of sphere 11 along a given axis since both distance and direction can be determined. If the direction of rotation were to reverse, a different waveform would be produced, illustrated in FIG. 3 as curve 35. For rotation in the opposite direction, curve 35 leads curve 33 by approximately ninety degrees. This being so, curve 35 is also the inverse of curve 34.

Figure 4:
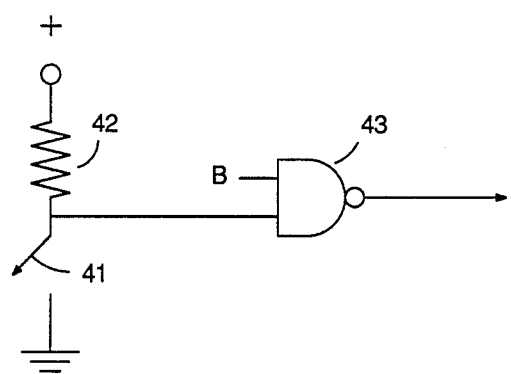

It is necessary for the circuitry of FIG. 2 to reverse the up/down sense of the signals depending upon whether the device is being used as a mouse or a trackball. It is not necessary to reverse the sense of motion for the left/right directions. Interface circuit 26 is readily modified, in accordance with the present invention, to accomplish this result by way of the circuitry illustrated in FIG. 4. In FIG. 4, switch 41 is the orientation detection switch. It is connected through load resistor 42 to a suitable supply voltage, i.e. 5 volts, and to ground. A tap connected at the junction of switch 41 and resistor 42 is connected as one input to logic gate 43. As illustrated, logic gate 43 comprises what is known as a NAND gate. The other input to gate 43 is connected to the source of waveform B illustrated in FIG. 3. When switch 41 is closed, the voltage on the tap is at ground potential. Under these circumstances, the output from gate 43 follows the other input, i.e. produces a signal like waveform 34 in FIG. 3. When switch 41 is open, the output signal is the inverse of the other input signal, i.e. it is the same as waveform 35 in FIG. 3. Thus, one can quite simply modify standard circuitry to accommodate the orientation detection and provide a device which can be used as either a mouse or a trackball.

There is thus provided by the present invention of a point and select device fully functional as either a mouse or a trackball without compromising the desirable features of either.

Having thus described the present invention it will be apparent to those of skill in the art that various modifications can be made within the spirit and scope of the present invention. While illustrated as comprising NAND logic, it is understood by those of skill in art that any suitable circuitry can be used for reversing the sense of the direction signal in response inverting the device. For example, exclusive-OR and AND logic will also perform this function. While described as separate elements, the sphere assembly can be purchased as a unit, e.g. from Marconi of Farmington, N.Y. Actuators 13 and 14 can simply comprise switches wired in parallel so that either one causes a given selection to be made or the actuators can be sensed separately to cause different selections to be made, depending upon which actuator is used.

We claim:

1. A point and select device which can function in either a mouse or a trackball mode comprising:
   a housing having an aperture in one major surface thereof;
   a spherical member located within said aperture;
   encoder means in contact with said spherical member for converting the rotation of said spherical member into a first electrical signal;
   orientation means for sensing the orientation of said housing and producing a second electrical signal indicative thereof; and
   interface means for combining said first and second electrical signals into an output signal indicative of the motion of said sphere and indicative of the proper sense of rotation, whether said device is oriented as a trackball or as a mouse, thereby enabling said device to function as either a trackball or a mouse.

2. The apparatus as set forth in claim 1 wherein said housing comprises ridges for cooperating with said spherical member in supporting said housing in the mouse mode.

3. The apparatus as set forth in claim 1 wherein said encoder means produces a signal indicative of the direction of rotation of said spherical member and wherein said interface means comprises inverter means for inverting said signal indicative of direction of rotation when said housing is in one of said mouse and trackball modes and for not inverting said signal when said housing is in the other of said mouse and trackball modes.

4. The apparatus as set forth in claim 1 and further comprising:
   actuator means for indicating a selection, said actuator means comprising two switches located one on each side of said housing.

5. The apparatus as set forth in claim 4 wherein said switches are electrically connected in parallel whereby said device has the same feel whether operated in a mouse or in a trackball mode.

* * * * *